United States Patent Office 3,695,922
Patented Oct. 3, 1972

3,695,922
COATED POLYOLEFIN FILMS AND PROCESS
FOR PREPARING SAME
Kiyoshi Chujo, Tetsuo Ishihara, and Hiroshi Osawa, Saitama, Japan, assignors to Diacel Ltd., Osaka, Japan
No Drawing. Filed Apr. 14, 1970, Ser. No. 28,504
Claims priority, application Japan, Apr. 17, 1969, 44/29,854
Int. Cl. B32b 27/32; B44d 1/14
U.S. Cl. 117—76 F          21 Claims

ABSTRACT OF THE DISCLOSURE

A process for the production of a heat-sealable, gas and water-vapor impermeable polyolefinic film which comprises applying a coating or coatings being on at least one surface of the film, the coating or coatings composed essentially of a copolymer of vinylidene chloride and a graft copolymer of a chlorinated polypropylene with an aromatic vinyl monomer such as styrene.

---

This invention relates to the preparation of coated polyolefin films. More particularly, the present invention relates to the preparation of a heat-sealable, gas and water-vapor impermeable, coated polyolefin film which is excellent in water vapor and oxygen gas impermeability, heat sealability, cellulose tape peeling strength of the coating and antiblocking property, and is particularly excellent in transparency.

The preparation of films from biaxially oriented isotactic polypropylene has been recently described and, because of their mechanical, protective and transparent properties, films from crystalline isotactic polypropylene stretched in two directions are materials which are expected to attain wide application in the packaging field. However, they are still low in oxygen gas impermeability. Further, as they are stretched in two directions in addition to their high crystallinity, thermoshrinkage of these films occurs at high temperature and their heat sealability is quite insufficient.

Therefore, in order to improve the oxygen gas impermeability and heat sealing property, there has been suggested a process of coating the film with a mixture of a copolymer of vinylidene chloride and a chlorinated polypropylene. However, even in this process, the heat sealing property and the cellulose tape peeling strength of the coating can be hardly said to be sufficient and further the miscibility of the copolymer of vinylidene chloride and the chlorinated polypropylene is so insufficient that the transparency of the coated film is unsatisfactory. Further, as the mixing ratio of the chlorinated polypropylene is limited due to the above insufficient miscibility, the improvements of the heat sealing property and cellulose tape peeling strength are consequently restricted.

We have discovered excellent coated polyolefin films based on crystalline polymers of alpha-olefins which are easily heat-weldable and are usable for the fabrication of containers, envelopes, small bags, vessels and for manufactured articles for the packaging industry, in which the defects of the prior art coated polyolefin films have been removed.

The present invention relates to coated polyolefin films prepared by coating a polyolefin film with a coating or coatings composed of (A) a graft polymer of a chlorinated polypropylene with an aromatic vinyl monomer such as styrene or a mixture thereof with a lesser amount of a copolymerizable aliphatic vinyl monomer and (B) a copolymer of vinylidene chloride.

The present invention provides a process for preparing coated polyolefin films comprising applying, in succession, an under-coating mainly consisting of a graft polymer of a chlorinated polypropylene with an aromatic vinyl monomer such as styrene (which shall be referred to merely as "graft polymer" hereinafter) and a top coating mainly consisting of a vinylidene chloride copolymer (which process shall be referred to as "two-step coating process" hereinafter) or applying a coating mainly consisting of a mixture of the graft polymer and a vinylidene chloride copolymer (which process shall be referred to as a "one-step coating process" hereinafter). The coated polyolefin film prepared by the present invention is higher in its heat sealing strength and cellulose tape peeling strength and particularly in its transparency than any conventional similar product.

As the graft polymer in the present invention, there can be preferably used a graft polymer prepared by graft-polymerizing 2 to 50% by weight (based on the graft polymer) of an aromatic vinyl monomer on a chlorinated polypropylene of a chlorine content of 15 to 55% by weight, obtained by chlorinating a polypropylene of an intrinsic viscosity of 0.3 to 3 dl./g. (deciliter/gram). The aromatic vinyl monomers include styrene, various nucleus-substituted styrenes and various α-hydrogen-substituted styrenes such as, for example, styrene, α-methylstyrene, p-methylstyrene, m-methylstyrene, 2,4-dimethylstyrene, 2,5-dimethylstyrene, o-chlorostyrene, m-chlorostyrene, p-chlorostyrene, 2,4-dichlorostyrene, 2,5-dichlorostyrene, o-bromostyrene and p-iodostyrene. Particularly preferred are styrene and α-methylstyrene. Further, as the aromatic vinyl monomer, there can be used also a monomer mixture consisting of an aromatic vinyl monomer and a lesser amount of another copolymerizable aliphatic vinyl monomer. Such copolymerizable aliphatic vinyl monomers include vinyl chloride, vinylidene chloride, vinyl acetate, vinyl propionate, 1,3-butadiene, acrylonitrile, methacrylonitrile, acrolein, various acrylates and various methacrylates. Acrylonitrile and methyl methacrylate are preferred among them.

As chlorinated polypropylenes, there can be used those obtained by chlorinating crystalline or amorphous polypropylenes. It is preferable that the intrinsic viscosity of the starting polypropylene is 0.3 to 3 dl./g. If the intrinsic viscosity is less than 0.3 dl./g., the film forming ability will be low and the heat seal strength of the coated polyolefin film will reduce. If the intrinsic viscosity is more than 3 dl./g., the viscosity of the solution becomes so high that the workability will become insufficient and the heat seal strength of the coated polyolefin film will tend to reduce. The particularly preferably range of the intrinsic viscosity is 0.5 to 1.5 dl./g. These intrinsic viscosity values are determined by measuring the viscosity of a dilute Decalin solution of the polymer at 135° C. The chlorine content of the chlorinated polypropylene is preferably 15 to 55% by weight. If it is less than 15%, the organic solvent solubility and the compatibility or miscibility of the graft polymer with copolymers of vinylidene chloride will become insufficient. If it is more than 55%, the heat stability of the graft polymer will be low and the heat seal strength of the coated polyolefin film will reduce. The chlorinated polypropylenes can be produced by chlorinating polypropylene in solutions, suspensions or dispersions according to any conventional method. Such conventional process has been described in detail, for example, in J. Polymer Sci., 55, 169 (1961) and "Kobunshi (High Polymers)," 9,903 (1960).

The graft polymerization of the aromatic vinyl monomers or monomers mixtures such as styrene on chlorinated polypropylenes can be carried out by any conventional process such as reported, for example, in Ind. Chem., 64, 172 (1961). The reaction can be made either in emulsions, suspensions or solutions, but, in view of the uniformity of the graft, the reaction in solutions is most preferable. As the solvent for the graft polymerization, there can be used various solvents which can dissolve a chlorinated polypropylene. Particularly preferable are aromatic hydrocarbons such as benzene and toluene and chlorinated hydrocarbons such as carbon tetrachloride and chloroform. As catalyst for the graft polymerization, there can be used various kinds of catalysts. Conventional radical polymerization catalysts such as peroxides, azo compounds, and persulfates and conventional redox type catalysts consisting of the above radical polymerization catalyst compounds and various reducing agents such as, for example, ascorbic acid, dimethylaniline, formaldehyde and sodium sulfoxylate can be used. Also various metal chelate compounds such as chelate compounds of transition metals in Groups I and VI to VIII in the Periodic Table with 1,3-dicarbonyl compounds, which have been recently proposed, can be used. For example, complex compounds of acetyl acetone and trivalent manganese can be preferably used. Further, it has been recently reported (for example, in Polymer Letters, 5, 697 (1967)) that mixtures of various activated metals with organic halogen compounds have some polymerization initiating activity. Therefore, in view of the fact that chlorinated polypropylenes have carbon-chlorine bonds, we have examined combinations of chlorinated polypropylenes with various activated metals and confirmed that a graft polymerization reaction can be initiated by such combinations. Therefore, various activated metals such as reduced copper, iron, nickel and cobalt can be used as graft polymerization initiators in preparing the graft polymer of the present invention. The amount of the polymerization catalyst to be used is generally 0.1 to 2.5 mol percent (based on the monomer) and is preferably 0.2 to 1.5 mol percent. However, in case an activated metal is used, the range of 0.5 to 15% by weight (based on the monomer) is generally used, preferably 1 to 8% by weight. The temperature and duration of the graft polymerization reaction can be selected in a wide range. However, the preferable temperature range is 20 to 100° C. and the duration of the polymerization time is usually 1 to 10 hours. Also various known chain transfer agents can be used in the graft polymerization reaction.

Further, the content of the aromatic vinyl monomer in the obtained graft polymer is preferably in the range of 2 to 30% by weight. If it is less than 2%, the effect of the graft will be insufficient and, if it is less than 30%, the heat seal strength of the polyolefin film will rather tend to reduce.

As the copolymers of vinylidene chloride to be used in the present invention, there can be used various known copolymers such as vinylidene chloride-acrylonitrile copolymers, vinylidene chloride-vinyl chloride copolymers, vinylidene chloride-vinyl acetate copolymers, vinylidene chloride-acrylate copolymers and vinylidene chloride-acrylic acid copolymers. Particularly preferable are vinylidene chloride-acrylonitrile copolymers and vinylidene chloride-vinyl chloride copolymers. The copolymerization ratios of these copolymers will be usually in the range of 80–97% of vinylidene chloride and 3–20% of the comonomer. Vinylidene chloride homopolymers are not suitable in respect of the heat stability, weather-proofness and softness of the film.

As the polyolefin film to be used in the present invention, there can be used transparent polyolefin films, either stretched in two directions or unstretched, such as crystalline polypropylene films and crystalline poly 4-methylpentene-1 films. However, biaxially oriented crystalline polypropylene films (stretched in two directions) are preferable in view of their high melting point, high transparency, high mechanical properties and excellent packaging characteristics.

In the prior art procedures for coating polyolefin films, it has been known to pretreat the surface of the film base with various surface treatment methods. In the present invention, it is possible to apply to the film base a known pretreatment such as corona discharge, a high frequency treatment, flame treatment or a treatment with a chemical agent (treatment with oxidizing agents, etc.). But it is one of the important features of the present invention that excellent results can be obtained without the application of such pretreatment.

In the present invention, any coating apparatus usually used in the production of moisture-proof cellophane such as a dip coater, roll coater or gravure coater can be used. Since the compatibility or miscibility of the graft polymer and the vinylidene chloride copolymer with each other is very excellent, the transparency of the coated film obtained by the one-step coating process is excellent and, therefore, the one-step coating process is more preferable than the two-step coating process in view of the superiority of the product and the simplicity of the coating apparatus and process. However, with the two-step coating process, a satisfactory result can be obtained. Further, additives such as antioxidants, dyes, pigments, lubricants, antistatic agents, antiblocking agents and ultraviolet ray stabilizers can be added to the coating. The coating may be applied according to the known methods, from solutions or dispersions of the coating in organic solvents or in water. The thickness of the coating may vary from 1 to $10\mu$ and it is most preferable to be in the range of 2 to $5\mu$. The thicker the coating layer, the higher the heat seal property and oxygen gas impermeability of the coated film. However, the excessive use of the coating will be economically undesirable and also unfavorable to the transparency of the film. In the one-step coating process, the ratio of the graft polymer and the vinylidene chloride copolymer to be used is suitably in the range of 1/99 to 20/80 by weight and is more preferably in the range of 3/97 to 10/90 by weight. If this ratio is smaller than 1/99, the improvements in the heat seal property and transparency of the film will not be sufficient and, if it is larger than 20/80, the oxygen gas impermeability and transparency of the film will become insufficient. However, in the case of a conventional process for the preparation of coated polyolefin films wherein a mixture of a chlorinated polypropylene (not grafted) and a vinylidene chloride copolymer is used instead of a mixture of a graft polymer and a vinylidene chloride copolymer of the present invention, the transparency of the film will become insufficient even with the incorporation of about 3% chlorinated polypropylene resin, the advantage of using a graft polymer according to the present invention will be apparent.

In the examples set forth hereinbelow, the measurement of various properties of the coated polyolefin films have been conducted by the test methods described in the following:

(a) Cellulose tape test

This is a method similar to a test method usually called a Scotch tape test. A pressure-sensitive adhesive cellulose tape (cellophane tape of the trademark "Cello-tape") of 24 mm. x 20 mm. is pressed on the surface of the coated film and then is rapidly peeled at an angle of 90 degrees. The stripped state of the coating is detected and is graded as follows:

No stripping of the coating _____ Excellent.
Stripped area of the coating less than 10% __ Good.
Stripped area of the coating of 10 to 20% __ Passable.
Stripped area of the coating more than 20% _ Bad.

(b) Heat seal strength

Coated surfaces of films are placed on each other and are heat-sealed with a bar type heat sealer under the conditions of the heater temperature of 120° C., sealing pressure of 2 kg./cm.$^2$ and pressing time of 2 seconds and the stripping strength of the heat seal is measured by stripping a sealed portion of a sample of 10 mm. x 150 mm. under the condition of a pulling velocity of 30 cm./min. by using a Tensilon.

(c) Printability test

A print is applied on a coated surface of the film by using an ink available for use on ordinary moisture-proof cellophane and the adhesiveness of the ink is tested by a Scotch tape peeling test.

No stripping of the ink _____ Good.
Stripping of the ink less than 20% _____ Passable.
Stripping of the ink more than 20% _____ Bad.

(d) Water vapor permeability

It is measured under the conditions of a temperature of 40° C. and relative humidity of 90% by using a cup specified in JIS Z-0208.

(e) Measurement of oxygen gas permeability

It is measured at 20° C. by using oxygen gas under a humidity of 0% and helium gas as a compensating gas by a gas chromatograph method (with Lysey gas permeability testing apparatus L-66).

(f) Transparency

It is ranked as follows by naked eye judgment:

When it is equal to that of a biaxially oriented polypropylene film ____ Excellent.
When it is very little lower than that of a biaxially oriented polypropylene film _____ Good.
When it is considerably lower than that of a biaxially oriented polypropylene film but is a little higher than that of a low density polyethylene film _____ Passable.
When it is equal to or lower than that of a low density polyethylene film __ Bad.

(g) Blocking property

Several sheets of film of 100 mm. x 100 mm. are inserted between two glass plates, are left standing for 8 hours under a load of 0.5 kg./cm.$^2$ at 40° C. and are left to cool to room temperature.

The blocking degree of the film is ranked as follows:

When the film can be separated into respective sheets even if no force is applied _____ Excellent.
When the film can be separated into sheets if a little force is applied ___ Good.
When the film can be separated into sheets if a force is applied but the coating is partly stripped from the film base _____ Passable.
When the film becomes a hard block and can not be separated into sheets without the breakdown of the film _ Bad.

Examples of this invention are described in the following but they are given to illustrate and not to limit the method of the present invention.

EXAMPLES 1 to 4

The graft polymer used in each of these examples was prepared as follows. That is to say, an isotactic polypropylene of an intrinsic viscosity of 1.0 dl./g. was dissolved at 120° C. in tetrachloroethylene and chlorine gas was blown into the solution in an ordinary manner to obtain a chlorinated polypropylene of a chlorine content of 30% by weight and an intrinsic viscosity of 0.8 dl./g. Then 120 g. of this chlorinated polypropylene, 0.7 liter of benzene and 120 g. of styrene were put into a polymerizing vessel of 1 liter and were well stirred to be dissolved. 2.8 g. of benzoyl peroxide were put into the solution. The solution was warmed to 70° C. and was made to react for 5 hours in a nitrogen atmosphere. The amount of the polymer obtained after the purification step by the reprecipitation of the reaction product was 132 g. By using a calibration curve prepared in advance from the infrared absorption spectrum of the polymer blends of the chlorinated polypropylene and polystyrene, the styrene content in the polymer was calculated to be 10.7%. By utilizing the fact that a chlorinated polypropylene is hardly soluble in acetone but that a polystyrene is soluble in acetone, this polymer was extracted with acetone and the styrene content in the undissolved portion was found to be 9.6%. Thus it was presumed that the greater part of the polymerized styrene was bonded in the form of a graft to the chlorinated polypropylene.

The graft polymer obtained by the above process was applied in the form of a dope having the composition as listed in the following table to coat one surface of a biaxially oriented polypropylene film having a contact angle of 65 degrees with water at 20° C. and a thickness of 20μ, pretreated by means of a corona discharge treatment, by means of a gravure coater. The coated film was dried for 5 minutes in an oven at 90° C. The amount of the resin coated on the film base after drying was 4.5 to 5.5 g./m.$^2$ in each case. In the following table, Controls 1 to 3 are outside the scope of the present invention and are shown for the purpose of comparison. Further, in preparing the dopes used in these examples and controls, uniform solutions could be made far more easily in Examples 1 to 4 than in Controls 2 to 3.

The properties of the thus obtained coated films were as shown in the following table.

|  | Example | | | | Control | | |
| --- | --- | --- | --- | --- | --- | --- | --- |
|  | 1 | 2 | 3 | 4 | 1 | 2 | 3 |
| Vinylidene chloride/vinyl chloride (87/13) copolymer | 20 | 20 | 20 | 20 | 20 | 20 | 20 |
| Graft polymer | 1 | 2 | 4 | 6 | | | |
| Original chlorinated polypropylene | | | | | | 1 | 2 |
| Tetrahydrofuran | 80 | 80 | 80 | 80 | 80 | 80 | 80 |
| Wax (melting point 65° C.) | 0.2 | 0.2 | 0.2 | 0.2 | 0.2 | 0.2 | 0.2 |
| Calcium carbonate | 0.02 | 0.02 | 0.02 | 0.02 | 0.02 | 0.02 | 0.02 |

NOTE.—The values in the table are all in parts by weight.

|  | Uncoated polypropylene film | Example | | | | Control | | |
| --- | --- | --- | --- | --- | --- | --- | --- | --- |
|  |  | 1 | 2 | 3 | 4 | 1 | 2 | 3 |
| Heat seal strength (g./15 mm.) |  | 190 | 210 | 220 | 235 | 40 | 170 | 180 |
| Cellulose tape test |  | (1) | (1) | (1) | (1) | (2) | (1) | (1) |
| Printability test | (2) | (1) | (1) | (1) | (1) | (2) | (1) | (1) |
| Water vapor permeability (g./m.$^2$/24 hrs.) | 8 | 4 | 5 | 5 | 5 | 4 | 4 | 5 |
| Oxygen gas permeability (cc./m.$^2$/24 hrs.) | 2,400 | 29 | 35 | 38 | 48 | 22 | 21 | 27 |
| Transparency | (1) | (1) | (1) | (3) | (4) | (1) | (4) | (5) |
| Blocking | (1) | (1) | (1) | (1) | (1) | (1) | (1) | (1) |

[1] Excellent.  [2] Bad.  [3] Excellent to good.  [4] Good.  [5] Passable.

EXAMPLES 5 to 9

The dope used in Example 1 was prepared by using the graft polymer used in the above mentioned Examples 1 to 4 and it was applied to coat a biaxially oriented polypropylene film and having a thickness of 20μ, pretreated with a corona discharge by varying its coating amount in the same manner as in Examples 1 to 4.

The coating amounts and the properties of the coated films were as shown in the following table.

|  | Example | | | | |
|---|---|---|---|---|---|
|  | 5 | 6 | 7 | 8 | 9 |
| Coating amount (g./m.²) | 2.5 | 3.8 | 5.2 | 7.4 | 10.5 |
| Heat seal strength (g./15 mm.) | 176 | 185 | 199 | 212 | 235 |
| Cellulose tape test | (¹) | (¹) | (¹) | (¹) | (¹) |
| Water vapor permeability (g./m.²/24 hrs.) | 4 | 4 | 5 | 4 | 5 |
| Oxygen gas permeability (cc./m.²/24 hrs.) | 26 | 22 | 19 | 16 | 12 |
| Transparency | (¹) | (¹) | (¹) | (²) | (³) |
| Blocking | (¹) | (¹) | (¹) | (¹) | (¹) |

¹ Excellent.  ² Excellent to good.  ³ Good.

EXAMPLE 10

The graft polymer used in this example was prepared in the following manner. That is to say, an isotactic polypropylene having an intrinsic viscosity of 1.5 dl./g. was chlorinated by the same process as was mentioned in Examples 1 to 4 to obtain a chlorinated polypropylene having a chlorine content of 28% by weight and intrinsic viscosity of 1.3. Then 120 g. of this chlorinated polypropylene, 0.7 liter of benzene and 60 g. of styrene were put into a polymerization vessel of 1 liter and were well stirred to be dissolved and 3 g. of reduced iron were put into the solution. The solution was made to react for 5 hours in a nitrogen atmosphere at 60° C. The obtained graft polymer was 131 g. The content of styrene in this polymer was 9.4%. A dope of the same composition as in Example 2 was made by using this graft polymer and a coated biaxially oriented polypropylene film was prepared in the same manner as in Example 2. The film pretreated with a corona discharge treatment and the film without such pretreatment (having an angle of contact with water of 83 degrees) were both tested.

The properties of the coated films were as follows:

|  | Discharge-treated | Not discharge-treated |
|---|---|---|
| Coating amount | 4.2 | 4.6 |
| Heat seal strength | 205 | 202 |
| Cellulose tape test | Excellent | Excellent |
| Printability test | Excellent | Excellent |
| Water vapor permeability | 4 | 5 |
| Oxygen gas permeability | 32 | 30 |
| Transparency | Excellent | Excellent |
| Blocking | Excellent | Excellent |

EXAMPLE 11

The graft polymer used in this example was prepared in the following manner. That is to say, exactly the same reaction as in Example 10 was conducted by using the chlorinated polypropylene mentioned in the above Example 10 except that 0.8 g. of a complex compound of acetyl acetone and trivalent manganese and 0.6 g. of t-dodecyl mercaptan were used as catalysts and 134 g. of a graft polymer were obtained. The content of styrene in this graft polymer was 12.6%. Coated films were made in the same manner as in Example 10 by using this graft polymer.

The properties of the coated films were as follows:

|  | Discharge-treated | Not discharge-treated |
|---|---|---|
| Coating amount | 4.4 | 4.1 |
| Heat seal strength | 216 | 205 |
| Cellulose tape test | Excellent | Excellent |
| Printability test | Excellent | Excellent |
| Water vapor permeability | 5 | 5 |
| Oxygen gas permeability | 31 | 34 |
| Transparency | Excellent | Excellent |
| Blocking | Excellent | Excellent |

EXAMPLES 12–13

Dopes were prepared according to the compositions shown in the following table by employing the graft polymer used in Examples 1 to 4 and coated films were made in the same manner as in Examples 1 to 4.

|  | Example | | Control | |
|---|---|---|---|---|
|  | 12 | 13 | 4 | 5 |
| Vinylidene chloride/acrylonitrile (85/15) copolymer | 20 | 20 | 20 | 20 |
| Graft polymer | 1 | 2 | | |
| Original chlorinated polypropylene | | | | 1 |

The solvent, wax and calcium carbonate were incorporated to make the respective dopes in the same ratios as in Examples 1 to 4.

The performances of the coated films were as mentioned below.

|  | Example | | Control | |
|---|---|---|---|---|
|  | 12 | 13 | 4 | 5 |
| Coating amount | 4.2 | 4.8 | 4.6 | 4.5 |
| Heat seal strength | 205 | 224 | 65 | 174 |
| Cellulose tape test | Excellent | Excellent | Bad | Excellent |
| Printability test | do | do | Bad | Do. |
| Water vapor permeability | 3 | 4 | 5 | 4 |
| Oxygen gas permeability | 20 | 24 | 26 | 22 |
| Transparency | Excellent to good | Excellent to good | Excellent | Passable to bad |
| Blocking | Excellent | Excellent | do | Excellent |

EXAMPLES 14 TO 17

Graft polymers of various styrene contents were made by varying the duration of the graft polymerization reaction in preparing the graft polymer used in Examples 1 to 4. Coated films were made in exactly the same manner as in Examples 1 to 4 according to the dope composition in Example 1 by employing these graft polymers. Their performances were as shown in the following table.

|  | Example | | | |
|---|---|---|---|---|
|  | 14 | 15 | 16 | 17 |
| Amount (percent) of styrene in the graft polymer | 3.5 | 7.8 | 14.6 | 20.5 |
| Coating amount | 4.4 | 4.0 | 4.2 | 4.8 |
| Heat seal strength | 175 | 192 | 186 | 170 |
| Cellulose tape test | Excellent | Excellent | Excellent | Excellent |
| Water vapor permeability | 4 | 6 | 4 | 5 |
| Oxygen gas permeability | 24 | 26 | 29 | 27 |
| Transparency | Excellent | Excellent | Excellent | Excellent |
| Blocking | Excellent | Excellent | Excellent | Excellent |

EXAMPLE 18

A graft polymerization reaction was carried out in exactly the same manner as in the preparation of the graft polymer in Example 10 except that 45 g. of styrene and 15 g. of acrylonitrile were used instead of 60 g. of styrene. The amount of the obtained polymer was 132 g. and it contained 8.6% styrene and 2.3% acrylonitrile. A biaxially oriented polypropylene film pretreated with a corona discharge treatment was coated by using this graft polymer in the same manner as in Example 10.

The properties of the coated film were as follows:

| | |
|---|---|
| Coating amount | 5.0. |
| Heat seal strength | 215. |
| Cellulose tape test | Excellent. |
| Printability test | Excellent. |
| Water vapor permeability | 5. |
| Oxygen gas permeability | 29. |
| Transparency | Excellent. |
| Blocking | Excellent. |

EXAMPLES 21 TO 23

The graft polymer used in these examples was produced in the following manner. That is to say, an isotactic polypropylene of an intrinsic viscosity of 1.0 dl./g. was dissolved at 120° C. in tetrachloroethylene and, in chlorinating the polypropylene by blowing chlorine gas into the solution, the duration of the chlorination reaction was varied to obtain chlorinated polypropylene of chlorine contents of 18, 25 and 40% by weight, respectively. Graft polymers were prepared from these chlorinated polypropylenes in the same manner as in Examples 1 to 4. The styrene contents of the obtained graft polymers were 11.0, 10.2 and 10.6%, respectively.

Coated films were made by the same dope composition and coating process as in Example 2 by using these graft polymers. The coating amount was 4.0 to 5.0 g./m.²

The properties of the coated films were as follows:

| | Example | | | Control | | |
|---|---|---|---|---|---|---|
| | 21 | 22 | 23 | 6 | 7 | 8 |
| Content of chlorine in the original chlorinated polypropylene | 18 | 25 | 40 | 18 | 25 | 40. |
| Kinds of polymer used | Graft polymer. | Graft polymer. | Graft polymer. | Chlorinated polypropylene. | | |
| Heat seal strength | 236 | 222 | 195 | 134 | 180 | 165. |
| Cellulose tape test | Excellent | Excellent | Excellent | Passable | Excellent | Excellent. |
| Water vapor permeability | 18 | 24 | 28 | 46 | 25 | 32. |
| Transparency | Excellent | Excellent | Excellent | Bad | Passable | Passable. |
| Blocking | do | do | Good | Excellent | Excellent | Good. |

EXAMPLE 19

A graft reaction was conducted in exactly the same manner as in the preparation of the graft polymer in Example 10 except that 30 g. of α-methylstyrene and 10 g. of methyl methacrylate were used instead of 60 g. of styrene. The amount of the obtained polymer was 131 g. and it contained 6.5% α-methylstyrene and 2.8% methyl methacrylate. A dope according to the composition used in Example 12 was prepared by using this graft polymer and a coated film made in the same manner as in Example 12.

The performances of this film were as follows:

| | |
|---|---|
| Coating amount | 4.3 |
| Heat seal strength | 210. |
| Cellulose tape test | Excellent. |
| Printability test | Excellent. |
| Water vapor permeability | 4. |
| Oxygen gas permeability | 22. |
| Transparency | Excellent. |
| Blocking | Excellent. |

EXAMPLE 20

The graft polymer used in this example was prepared as follows. That is to say, a noncrystalline polypropylene of an intrinsic viscosity of 0.64 was dissolved at 80° C. in toluene and chlorine gas was blown into the solution to obtain a chlorinated polypropylene of a chlorine content of 32% by weight. A graft polymer was obtained in exactly the same manner as in Examples 1 to 4 by using this chlorinated polypropylene polymer. The content of styrene in the obtained graft polymer was 14.6%.

A coated film was made according to the dope composition and coating process in Example 1 and by using the graft polymer obtained by the above process.

The properties of the film were as follows:

| | |
|---|---|
| Coating amount | 4.8. |
| Heat seal strength | 186. |
| Cellulose tape test | Excellent. |
| Printability test | Excellent. |
| Water vapor permeability | 5. |
| Oxygen gas permeability | 2.6. |
| Transparency | Excellent. |
| Blocking | Excellent. |

In the above table, Controls 6 to 8, in which chlorinated polypropylenes were used instead of graft polymers thereof, correspond respectively to Examples 21 to 23. In Control 6, the chlorine content was so low that the chlorinated polypropylene was hard to dissolve in the solvent and, therefore, uniform coating was difficult and various properties were inferior. But, in Example 21, the graft polymer was excellent in the solubility and the performances of the film were very excellent.

EXAMPLE 24

A 2% tetrahydrofuran solution of the graft polymer used in Example 10 was prepared. It was applied to coat one surface of a biaxially oriented polypropylene film pretreated with a corona-discharge treatment and stretched in two directions by means of a gravure coater and was then dried for 1 minute in an oven at 80° C. The amount of the coated resin at this under coat was 2.2 g./m.².

Then a dope according to the composition in Control 1 was further applied on the above under coating by using the gravure coater and was then dried for 5 minutes in an oven at 90° C. The amount of the coated resin at this top coating was 3.0 g./m.². The performances of the thus obtained coated film were as follows:

| | |
|---|---|
| Heat seal strength | 215. |
| Cellulose tape test | Excellent. |
| Printability test | Excellent. |
| Water vapor permeability | 3. |
| Oxygen gas permeability | 24. |
| Transparency | Excellent. |
| Blocking | Excellent. |

What we claim is:

1. A process for preparing coated polyolefin film, which comprises the steps of applying to the surface of a polyolefin film, an organic solvent solution or water dispersion of a coating composition consisting essentially of a mixture of
   (A) from 1 to 20% by weight of a graft polymer of
      (1) from 2 to 50% by weight of aromatic vinyl monomer selected from the group consisting of
         (a) styrene, (b) substituted styrene and (c) a mixture of styrene or substituted styrene with a lesser amount of copolymerizable aliphatic vinyl monomer, graft polymerized onto (2) chlorinated polypropylene having (a) an intrinsic viscosity in the range of 0.3 to 3 dl./g., measured in a dilute solution in Decalin at 135° C., and having (b) a chlorine content in the range of 15 to 55% by weight, (B) the balance of the coating composition consisting of a copolymer of vinylidene chloride containing from 80 to 97% of vinylidene chloride and from 3 to 20% of the comonomer;

and then drying the coating composition to obtain the coated polyolefin film product.

2. The process as claimed in claim 1 wherein said aromatic vinyl monomer is a monomer selected from the group consisting of styrene and α-methylstyrene.

3. The process as claimed in claim 1 wherein said aliphatic vinyl monomer is a monomer selected from the group consisting of acrylonitrile and methyl methacrylate.

4. The process as claimed in claim 1 wherein the content of said aromatic vinyl monomer in the graft polymer is in a range of 2 to 30% by weight.

5. The process as claimed in claim 1 wherein said polyolefin film is a crystalline isotactic biaxially oriented polypropylene film.

6. A process for preparing coated polyolefin film, which comprises the steps of applying to the surface of a polyolefin film, an organic solvent solution or water dispersion of a graft polymer of (1) from 2 to 50% by weight of aromatic vinyl monomer selected from the group consisting of (a) styrene, (b) substituted styrene and (c) a mixture of styrene or substituted styrene with a lesser amount of copolymerizable aliphatic vinyl monomer, graft polymerized onto (2) chlorinated polypropylene having (a) an intrinsic viscosity in the range of 0.3 to 3 dl./g., measured in a dilute solution in Decalin at 135° C., and having (b) a chlorine content in the range of 15 to 55% by weight, drying the graft polymer coating to form an undercoat layer, then applying to the undercoat layer an organic solvent solution or water dispersion of a copolymer of vinylidene chloride containing from 80 to 97% of vinylidene chloride and from 3 to 20% of the comonomer, and then drying said copolymer to obtain the coated polyolefin film product.

7. The process as claimed in claim 6 wherein said aromatic vinyl monomer is a monomer selected from the group consisting of styrene and α-methylstyrene.

8. The process as claimed in claim 6 wherein said aliphatic vinyl monomer is a monomer selected from the group consisting of acrylonitrile and methyl methacrylate.

9. The process as claimed in claim 6 wherein the content of said aromatic vinyl monomer in the graft copolymer is in a range of 2 to 30% by weight.

10. A coated polyolefin film consisting of a polyolefin film base having a coating consisting essentially of a mixture of (A) from 1 to 20% by weight of a graft polymer of
(1) from 2 to 50% by weight of aromatic vinyl monomer selected from the group consisting of (a) styrene, (b) substituted styrene and (c) a mixture of styrene or substituted styrene with a lesser amount of copolymerizable aliphatic vinyl monomer, graft polymerized onto
(2) chlorinated polypropylene having (a) an intrinsic viscosity in the range of 0.3 to 3 dl./g., measured in a dilute solution in Decalin at 135° C., and having (b) a chlorine content in the range of 15 to 55% by weight, (B) the balance of the coating composition consisting of a copolymer of vinylidene chloride containing from 80 to 97% of vinylidene chloride and from 3 to 20% of the comonomer.

11. A coated polyolefin film according to claim 10, in which the vinylidene chloride copolymer is selected from the group consisting of vinylidene chloride-acrylonitrile copolymers, vinylidene chloride-vinyl chloride copolymers, vinylidene chloride-vinyl acetate copolymers, vinylidene chloride-acrylate copolymers and vinylidene chloride-acrylic acid copolymers.

12. A coated polyolefin film according to claim 10, in which the thickness of the coating is in the range of 1 to 10μ.

13. The coated polyolefin film according to claim 10 wherein said aromatic vinyl monomer is a monomer selected from the group consisting of styrene and α-methylstyrene.

14. The coated polyolefin film according to claim 10 wherein said aliphatic vinyl monomer in a lesser amount is a monomer selected from the group consisting of acrylonitrile and methyl methacrylate.

15. The coated polyolefin film according to claim 10 wherein said polyolefin film is a crystalline isotactic biaxially oriented polypropylene film.

16. A coated polyolefin film consisting of a polyolefin film base having thereon an undercoat layer consisting essentially of a graft polymer of (1) from 2 to 50% by weight of aromatic vinyl monomer selected from the group consisting of (a) styrene, (b) substituted styrene and (c) a mixture of styrene or substituted styrene with a lesser amount of copolymerizable aliphatic vinyl monomer, graft polymerized onto
(2) chlorinated polypropylene having (a) an intrinsic (viscosity in the range of 0.3 to 3 dl./g., measured in a dilute solution in Decalin at 135° C., and having (b) a chlorine content in the range of 15 to 55% by weight, and a top coat layer on said undercoat layer and consisting essentially of a copolymer of a vinylidene chloride containing from 80 to 97% of vinylidene chloride and from 3 to 20% of the comonomer.

17. The coated polyolefin film according to claim 16 wherein said aromatic vinyl monomer is a monomer selected from the group consisting of styrene and α-methylstyrene.

18. The coated polyolefin film according to claim 16 wherein said aliphatic vinyl monomer in a lesser amount is a monomer selected from the group consisting of acrylonitrile and methyl methacrylate.

19. The coated polyolefin film according to claim 16 wherein said polyolefin film is a crystalline isotactic biaxially oriented polypropylene film.

20. A coated polyolefin film according to claim 16, in which the vinylidene chloride copolymer is selected from the group consisting of vinylidene chloride-acrylonitrile copolymers, vinylidene chloride-vinyl chloride copolymers, vinylidene chloride-vinyl acetate copolymers, vinylidene chloride-acrylate copolymers and vinylidene chloride-acrylic acid copolymers.

21. A coated polyolefin film according to claim 16, in which the thickness of the coating is in the range of 1 to 10μ.

References Cited

UNITED STATES PATENTS

| | | | |
|---|---|---|---|
| 3,353,991 | 11/1967 | Shelburg et al. | 117—138.8 E |
| 3,271,477 | 9/1966 | Kresge | 117—138.8 E X |
| 2,987,501 | 6/1961 | Rieke et al. | 117—138.8 E X |
| 3,228,791 | 1/1966 | Armour et al. | 117—138.8 E |
| 3,262,899 | 7/1966 | Armour et al. | 117—138.8 E X |

RALPH HUSACK, Primary Examiner

U.S. Cl. X.R.

117—122 H, 138.8 E, 161 UH; 260—875, 884, 886